Aug. 23, 1955　　　O. C. OLSEN　　　2,715,969
APPARATUS FOR TRANSPORTATION OF FREIGHT
Original Filed Oct. 19, 1938　　　4 Sheets-Sheet 2
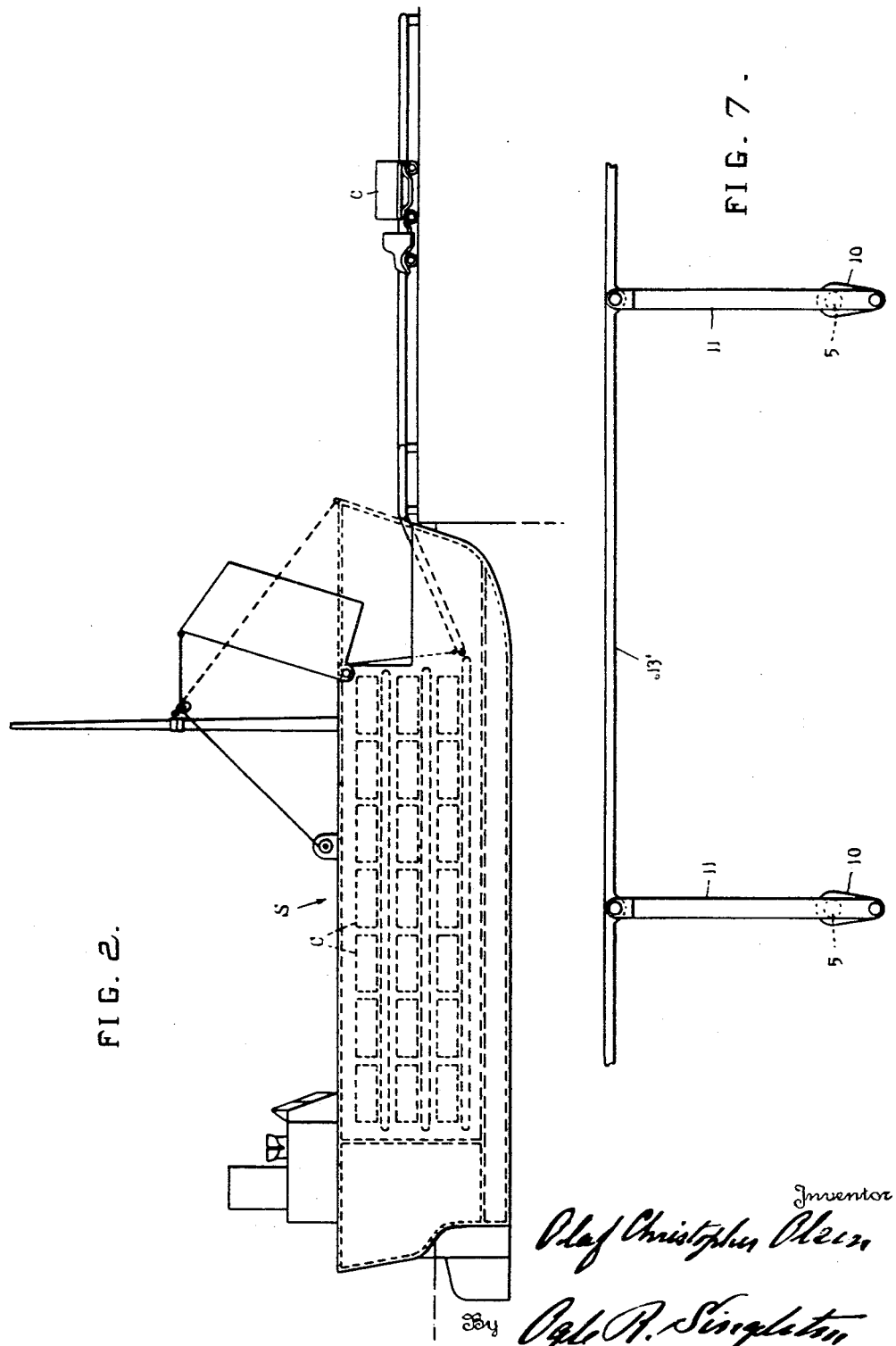

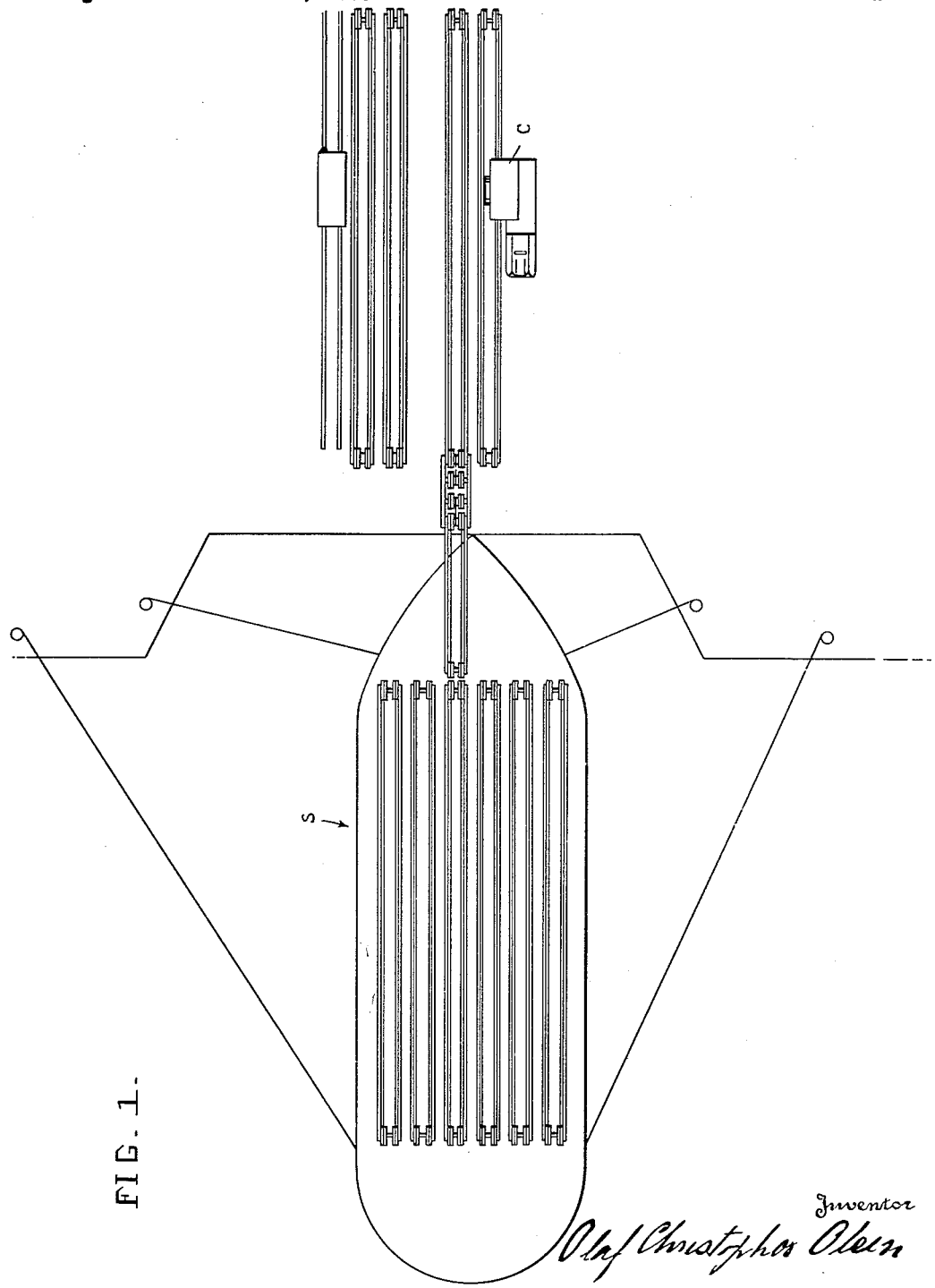

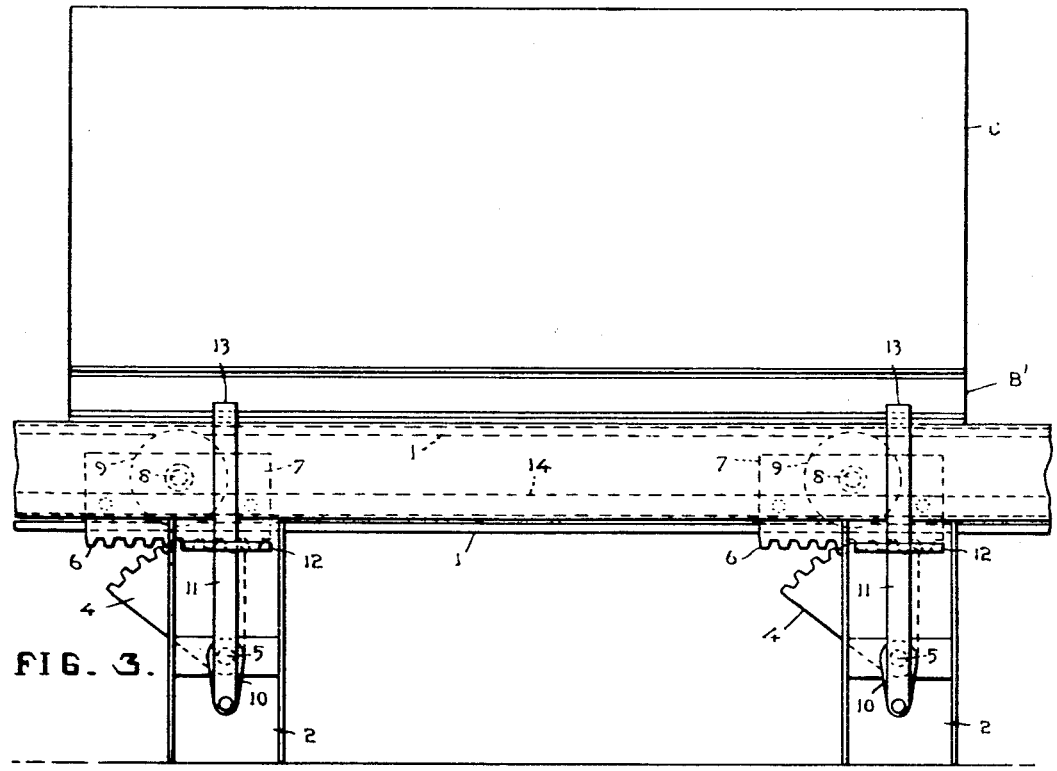
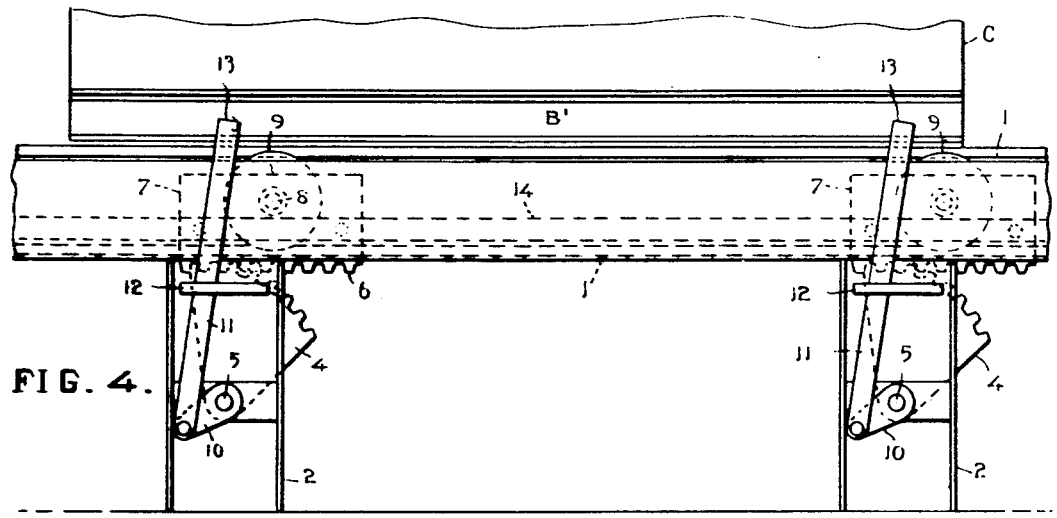

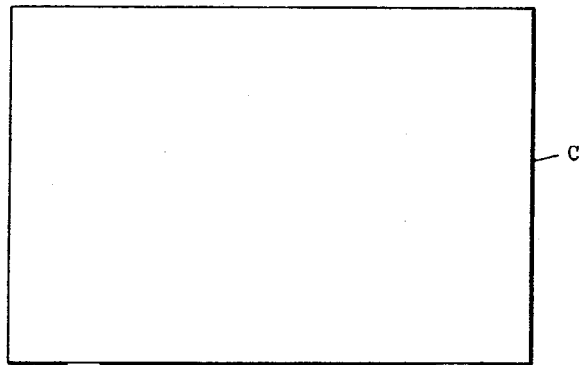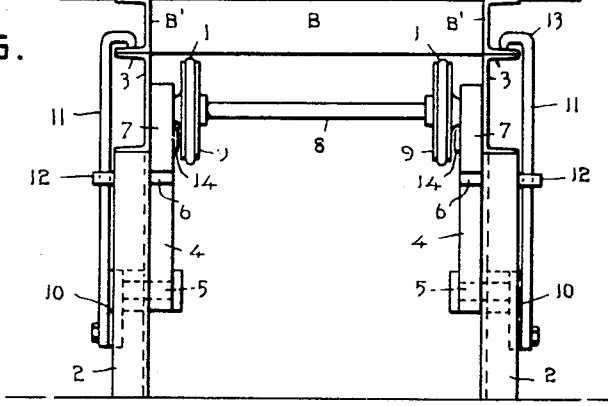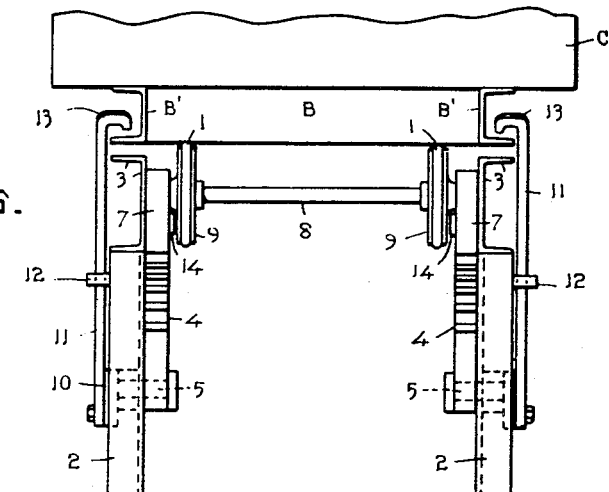

United States Patent Office 2,715,969
Patented Aug. 23, 1955

2,715,969

APPARATUS FOR TRANSPORTATION OF FREIGHT

Olaf Christopher Olsen, Johnson County, Kans., assignor to Transport Equipment, Inc., a corporation of Maryland Substituted for application Serial No. 235,857, October 19, 1938. This application May 10, 1950, Serial No. 161,210

4 Claims. (Cl. 214—15)

My invention consists in a new and useful improvement in apparatus for the transportation of freight, and is designed more particularly for transportation of freight of less than carload lots in containers which are handled entirely mechanically by conveyor mechanisms incorporated in land and water vehicles. This application is a substitute application for application Serial Number 235,857, filed on October 19, 1938, and now abandoned.

My improved ship is provided with a plurality of trackways, each having conveyor cables to move the containers, and a novel form of locking mechanism whereby the containers are firmly attached to the ship when properly stowed in the hold.

While I have illustrated in the drawings filed herewith and have hereinafter fully described certain specific embodiments of my invention, it is to be distinctly understood that I do not consider my invention to be limited to said specific embodiments, but refer for its scope to the claims appended hereto.

In the drawings:

Fig. 1 is a diagrammatic plan view illustrating my improved apparatus.

Fig. 2 is a side elevation.

Fig. 3 is a side elevation of the mechanism for fixing the containers in the hold of the ship, the parts being shown in locking position.

Fig. 4 is a view similar to Fig. 3, the parts being shown in unlocked position.

Fig. 5 is an end elevation of the mechanism for fixing the containers in the hold of the ship, the parts being shown in locked position.

Fig. 6 is a view similar to Fig. 5, the parts being shown in unlocked position.

Fig. 7 is a modified form of locking mechanism for fixing the containers in the hold of the ship.

As illustrated in the drawings, my improved ship S is provided with conveyor mechanism and mechanism for fixing the containers in the hold. The ship S is provided with a plurality of conveyor cables 1 suitably mounted and disposed in horizontal rows in vertical tiers, as illustrated in Figs. 1 and 2. These cables 1 are suitably arranged in pairs so as to support and convey the containers C, as illustrated in Figs. 3, 4, 5 and 6. Suitable pillars 2 are suitably positioned in the hold of the ship S and carry angle beams 3 arranged in pairs to form trackways. I provide segmental racks 4 carried by crank shafts 5 journaled in the pillars 2. With each of these racks 4, there meshes a rectilinear rack 6 carrying a journal box 7, the racks 4 and 6 being disposed in pairs so that in their journal boxes 7 there is journaled the axle 8 carrying the pulleys 9 for the conveyor cables 1. Each of the crank shafts 5 is provided with a crank arm 10 in which is pivoted a link 11 passed through a bail 12 on the outside of the pillar 2 and carrying at its upper end a hook 13.

The container C is provided with a base B provided on its sides with angle beams B' so designed as to register with the beams 3 forming the trackways in the hold of the ship S.

It is to be noted that, as clearly illustrated in Figs. 3 and 4, the conveyor and locking mechanism is so disposed and related that I provide four pulleys 9 for the conveyor cables 1, with four locking hooks 13, for each container C. I provide any suitable means for oscillating the journal boxes 7, as rods 14 operated by any suitable means. It is obvious from Figs. 3 and 4, that the segmental racks 4 are so designed that when the journal boxes 7 with their racks 6 are oscillated, the segmental racks 4 will cause the boxes 7 with their axles 8 and pulleys 9 to be reciprocated vertically, raising and lowering the conveyor cables 1 and the container C resting thereon, so that the beams B' are brought into and out of contact with the beams 3, the hooks 13 operating through the crank arms 10 to fix the beams B' and consequently the container C on the beams 3 when the conveyor cables 1 are depressed by the pulleys 9 to impose the container C upon the trackway formed by the beams 3.

In Fig. 7, there is illustrated a modified form of locking mechanism in which the links 11 have pivoted thereon the locking bars 13', instead of the hooks 13, co-operating with the beams B' to fix the containers C upon the beams 3.

It is obvious that by providing suitable driving means for any one of the axles 8, of each trackway in the hold of the ship, the containers C can be moved by the conveyor cables 1.

Having described the details of construction, I will now describe their use. We will assume that one of the containers C has been charged with the load of freight to be transported. It is to be particularly noted that the disposition of the parts is such that, when the container C is imposed upon the cables 1, its beam B' will register with the beams 3 of the trackway in the hold of the ship S, as illustrated in Fig. 6. The container C being conveyed to the desired point, power is applied to rods 14 to reciprocate them, thereby depressing their associated journal boxes 7, axles 8 and pulleys 9, thereby causing the cables 1 to impose the beams B' upon the beams 3, as illustrated in Fig. 5, and the locking hooks 13, being depressed, secure the container C rigidly upon the beams 3. It is obvious that use can be made of the modified form of locking mechanism illustrated in Fig. 7, the locking rods 13' bearing upon the beams B'. It is to be understood that the mechanism for reciprocating the cables 1, illustrated in Figs. 3, 4, 5 and 6, is designed and disposed as a plurality of units to control sections of cables 1, to reciprocate containers C respectively, into and out of contact with beams 3. It will be obvious, as illustrated in Fig. 2, that a container C can be positioned in the hold of the ship S and secured upon the beams 3, and that the cables 1 can convey other containers C to be positioned, on the same trackway, serially relative to the originally positioned container C, thereby providing means of great flexibility in the process of loading the hold. Should it be desirable to operate each trackway as a single loading unit, the modified form of locking means, illustrated in Fig. 7, can be utilized.

It is obvious that mere reversal of the several steps of the heretofore described method serves to move the container C from the hold of the ship S, and, it is possible to move containers C into and out of the hold of the ship S, simultaneously.

It is obvious that the container C for the freight may be of any desired form and size, to provide a supporting medium for the particular kind of freight to be transported, such as a mere platform, a stake body, a closed body, a refrigerated body, a tank body, etc.

Having described my invention, what I claim is:

1. In apparatus for the transportation of freight, the combination of a container for the freight; a water vehicle; a platform in said vehicle; conveyor cables adapted to travel longitudinally of said platform to move said container to any desired point along said platform; means adapted to reciprocate said cables transversely of their direction of travel to cause said container to move into and out of contact with said platform; and clamping means operated by said reciprocating means and adapted to clamp said container upon said platform when said container is moved into contact with said platform.

2. In apparatus for the transportation of freight, the combination of a container for the freight, provided with longitudinal base beams; a water vehicle provided with beams so disposed as to register with the beams of the container when the container is imposed upon the beams of the vehicle; conveyor cables adapted to travel longitudinally of said vehicle beams to move said container to any desired point along said vehicle beams; means adapted to reciprocate said cables transversely to their direction of travel to cause said container to move into and out of contact with said vehicle beams; and clamping means operated by said reciprocating means and adapted to clamp said container beams to said vehicle beams.

3. In apparatus for the transportation of freight, the combination of a plurality of containers for the freight; a water vehicle; a horizontal platform in said vehicle; conveyor cables adapted to travel longitudinally of said platform to move each of said containers along said platform; means adapted to reciprocate vertically said cables to cause each of said containers to move into and out of contact with said platform; and clamping means operated by said reciprocating means and adapted to clamp each of said containers upon the platform when said container is moved into contact with said platform, said reciprocating and clamping means being adapted to control the plurality of containers serially.

4. In apparatus for the transportation of freight, the combination of a plurality of containers for the freight; a water vehicle; a horizontal platform in said vehicle; conveyor cables adapted to travel longitudinally of said platform to move said containers along said platform; means adapted to reciprocate vertically said cables to cause said containers to move into and out of contact with said platform; and clamping means operated by said reciprocating means and adapted to clamp said containers upon the platform when the containers are moved into contact with said platform.

References Cited in the file of this patent

UNITED STATES PATENTS

| | | |
|---|---|---|
| 929,139 | Kirchner | July 27, 1909 |
| 1,404,947 | Fitch | Jan. 31, 1922 |
| 1,783,363 | Grob | Dec. 2, 1930 |
| 1,900,867 | Olds | Mar. 7, 1933 |
| 1,910,398 | Ludington | May 23, 1933 |
| 1,940,242 | Burgess | Dec. 19, 1933 |
| 2,045,566 | Berg | June 30, 1936 |
| 2,096,958 | Clerc | Oct. 26, 1937 |
| 2,287,886 | Kellett | June 30, 1942 |
| 2,409,870 | Kinnaird | Oct. 22, 1946 |
| 2,467,354 | Baldwin | Apr. 12, 1949 |

FOREIGN PATENTS

| | | |
|---|---|---|
| 248,758 | Great Britain | Feb. 3, 1927 |
| 595,507 | Germany | Apr. 18, 1934 |